(12) United States Patent
Wawrla et al.

(10) Patent No.: US 6,938,280 B2
(45) Date of Patent: Sep. 6, 2005

(54) LAVATORY WITH SENSOR

(75) Inventors: Andreas Wawrla, Widnau (CH); Helmut Buechel, Heerbrugg (CH)

(73) Assignee: Aquis Sanitaer AG, Rebstein (CH)

( * ) Notice: Subject to any disclaimer, the term of this patent is extended or adjusted under 35 U.S.C. 154(b) by 0 days.

(21) Appl. No.: 10/094,990

(22) Filed: Mar. 12, 2002

(65) Prior Publication Data

US 2002/0157176 A1 Oct. 31, 2002

(30) Foreign Application Priority Data

Mar. 12, 2001 (DE) .......................................... 101 12 179

(51) Int. Cl.⁷ .............................................. E03D 13/00
(52) U.S. Cl. ...................................................... 4/304
(58) Field of Search .............................. 4/304, DIG. 3

(56) References Cited

U.S. PATENT DOCUMENTS

| | | | | |
|---|---|---|---|---|
| 4,541,563 A | * | 9/1985 | Uetsuhara | 239/64 |
| 4,742,583 A | * | 5/1988 | Yoshida et al. | 4/313 |
| 5,063,955 A | * | 11/1991 | Sakakibara | 137/1 |
| 5,251,872 A | * | 10/1993 | Kodaira | 251/129.04 |
| 5,497,135 A | * | 3/1996 | Wisskirchen et al. | 335/253 |
| 5,588,636 A | * | 12/1996 | Eichholz et al. | 251/129.04 |
| 5,651,384 A | * | 7/1997 | Rudrich | 137/1 |
| 6,286,153 B1 | * | 9/2001 | Keller | 4/301 |

FOREIGN PATENT DOCUMENTS

| | | |
|---|---|---|
| DE | A-196 08 157 | 7/1997 |
| EP | A-1 057 942 | 12/2000 |
| JP | A-09242155 | 9/1997 |
| JP | A-2000282528 | 10/2000 |
| WO | WO-A-0116436 | 3/2001 |

OTHER PUBLICATIONS

The Spectrum of Visible Light pp. 1–2.*

* cited by examiner

*Primary Examiner*—Charles E. Phillips
(74) *Attorney, Agent, or Firm*—Breneman & Georges

(57) ABSTRACT

A lavatory (1), in particular a toilet or urinal, with sensor-controlled flushing is proposed, which eliminates the need to exchange a battery, or at least ensures a considerably longer service life. This object is achieved by providing a solar cell (22, 23) to supply power.

15 Claims, 3 Drawing Sheets

LAVATORY WITH SENSOR

The invention relates to a lavatory, in particular a toilet or urinal, with a sensor and a electromagnetic valve for sensor controlled flushing having a solar cell provided for supplying electrical power.

Lavatories resp. closets with electronic flushing units, hereinafter also referred to as sensor-controlled flushing units, already constitute prior art. In this case, a sensor detects a person sitting on the toilet or standing in front of the urinal, and activates an automatic flushing unit after a specific delay period has elapsed or the person has left the toilet. This automatic flushing unit improves hygiene conditions relative to the toilet in question. Previous flushing units were connected to a mains system or battery, which supplied power to the sensor-controlled flushing unit. Since the storage capacity of such acceptably sized batteries is necessarily limited, the battery has to be replaced at specific intervals during battery-powered operation.

Since such lavatories with sensor-controlled flushing units are generally used in public facilities such as airports, train stations, etc., replacing the appropriate number of batteries is correspondingly costly.

Therefore, the object of the invention is to propose a lavatory, in particular a toilet or urinal, with a sensor-controlled flushing unit, which avoids battery replacement or at least ensures a significantly longer service life.

This object is achieved based on a lavatory of the kind mentioned at the outset with an eletromagnetic valve for sensor controlled flushing having a solar cell provided for supplying electrical power The measures specified in the subclaims permit advantageous embodiments and further developments of the invention.

Consequently, a lavatory according to the invention is characterized in that a solar cell is provided for purposes of power supply.

Contrary to the widespread opinion that a solar cell is useless inside buildings, in particular in windowless rooms, it has been demonstrated that the energy from artificial light and/or daylight inside enclosed rooms such as restrooms can indeed be used to such an extent as to at least intermittently operate a sensor-controlled water flushing unit. For example, the solar cell can be designed in such a way that the solar cell covers all or part of the power required by the lavatory.

In a further development of the invention, a rechargeable electrical storage unit is provided for the solar cell. Preferably used as an additional storage unit for the solar cell in this combination is a capacitor having a capacity adequate to store enough of the solar power available inside closed rooms when the flushing unit is idle, and to provide this solar power for operating the flushing unit and lavatory. The capacitor is more cost-effective than an accumulator, and generally has a longer life. The storage unit can also be designed as an accumulator and/or an at least partially chargeable battery.

Also, an accumulator and/or a non-chargeable battery can potentially be used to supply non-solar power, wherein they are not provided as intermediate storage units for solar power.

In addition to the solar cell according to the invention, the lavatory is preferably also operated with additional, non-solar power by way of a battery and/or an accumulator. Non-solar power supply by way of a battery or an accumulator ensures a basic supply of electrical power to the water flushing unit, while the solar cell is able to diminish or suspend consumption of power from the accumulator given a sufficient influx of light, and thereby greatly increase the accumulator's service life. Replacement cycles for the battery or accumulator on the order of 10 years are entirely possible through the combination of a battery, an accumulator and/or capacitor with solar cells according to the invention.

Primarily during the use of an accumulator and/or a battery for supplying additional power, these can be used either alternatively or in combination as intermediate storage units, or at least partially chargeable storage units, for solar power, and in particular for supplying non-solar power.

In a further advantageous development of the invention, the solar cell is specifically tailored to the wavelength or frequency of the amount of light anticipated in closed rooms. In this case, an adjustment to artificial lighting is especially advantageous. Restrooms that have no windows, but are continuously illuminated with artificial light, can often be encountered in public buildings. Designing the solar cell for the emission spectrum of the corresponding light sources, e.g., tubular gas lamps or the like, makes it possible to achieve an optimal energy yield, and hence further extend battery life.

In a special embodiment, at least two solar cells specifically designed for different light wavelengths are provided. In this way, for example, one solar cell can be specifically designed for interior lighting, and the other solar cell for daylight. This ensures a good energy yield even as lighting conditions change in the respective toilet area.

Also conceivable in this vein is the use of a solar cell that can be variably adjusted to the wavelength of incident light, provided that these types of solar cells become available at reasonable prices in the future.

In addition, a sensor-controlled flushing unit with a solar power source can be improved by using a bistable electromagnetic valve to initiate or terminate the flush. Such a valve can be switched by means of switching pulses, so that it requires no continuous current. This markedly reduces the power consumption of such a valve, in particular in the case of the so-called servo-valve, thereby making it possible to operate the flushing unit with solar power only, even in closed rooms, given the appropriate lighting conditions.

In general, the lavatory can be "flush-mounted" or "surface-mounted." In flush-mounted models, the toilet bowl or the WC or urinal basin are mounted to the toilet wall, in general along with a cover plate or the like. In this model, the flushing unit with water line and, if necessary, water tank, electronics, control valve, etc., is situated behind or in the wall. The cover plate can be removed from the wall for purposes of assembly and/or repairs on the flushing unit.

In surface-mounted models, the toilet bowl or WC or urinal basin are situated in front of the toilet wall, along with the flushing unit and water line, control valve, etc. In this model, part of the flushing unit is often provided with a housing or the like, or located inside the water tank.

Lavatories with or without a water tank or flushing box can basically be used according to the invention.

The solar cell and sensor are preferably combined into a single structural unit, which can additionally accommodate the electronic controller for the flushing unit. This improves convenience, which has a particularly favorable impact with respect to the maintenance and assembly of a lavatory according to the invention.

The structural unit is advantageously spaced apart from the wall and/or designed as a separate housing with or without a water tank. For example, surface-mounted lavatories according to the invention can here be retrofitted or equipped in a particularly easy manner. The solenoid valve or the like is often additionally integrated into the separate housing.

If necessary, the solar cell is separately arranged or secured to a wall of the toilet, and/or to the housing of the flushing unit, water tank, flushing box or the like in front of the wall. In a specific embodiment of the invention, the structural unit mentioned above is fitted with an integrated sensor and solar cell as a wall enclosure or cover plate, which is secured to the wall in the area of the lavatory. In a further, also advantageous embodiment, the solar cells and/or sensor are integrated into the toilet bowl or flush basin, along with the controller, including a battery or an accumulator. Above all, this embodiment facilitates the assembly by the customer of a lavatory according to the invention.

Adding to its function as a power source, the solar cell is simultaneously used as a brightness sensor in a further development of the invention, e.g., for controlling the sensor-controlled toilet-flushing unit. This makes it possible to detect and evaluate, using the solar cell, different operating modes—e.g., less frequented times of the day—as a function of light, and activate the most varied of operating modes. The solar cell used as a brightness sensor can detect when daylight streams into the toilet and/or the interior lighting of the toilet comes on, and the desired operating mode can be initiated. The brightness can be detected, for example, by evaluating the electrical power that the solar cell currently has available.

In addition, the solar cell can be used as a brightness sensor for other functions not specific to the lavatory. For example, the interior lighting, ventilation, etc., can be controlled using these brightness sensors.

One special further development of the lavatory according to the invention also encompasses an interface with bus capability. This type of interface can be used to program or activate the electronic controller of the lavatory-flushing unit. Moreover, other components in the room, e.g., an interior lighting or ventilation controller, can communicate with the lavatory controller via such an interface, e.g., to transmit the data acquired by the solar cell regarding the brightness inside the room.

A special further development of this embodiment provides for the use of a wireless data bus, e.g., via radio, infrared, ultrasound or radar emission, which eliminates the need for the expensive installation of cable systems by the customer. This is important especially in conjunction with a lavatory with solar cell according to the invention, since the advantages to such a lavatory in particular are that no expensive cable installation is required.

In a special further development of the invention, the sensor of the lavatory is used for realizing the wireless bus interface. These types of sensors are frequently infrared or ultrasound sensors, and normally have a transmit and receive part for the corresponding emission. In the described further development of the invention, the sensor transmitter and receiver can now be used for wireless data transmission.

In addition to infrared, ultrasound or radar sensors, use can basically be made of other, commercially available sensors, primarily for the indirect detection of a lavatory user, e.g., conductance, temperature, pH, level sensors or the like.

The drawing shows an embodiment of the invention and will be explained in greater detail below based on the figures.

Depicted on:

Figure 1:
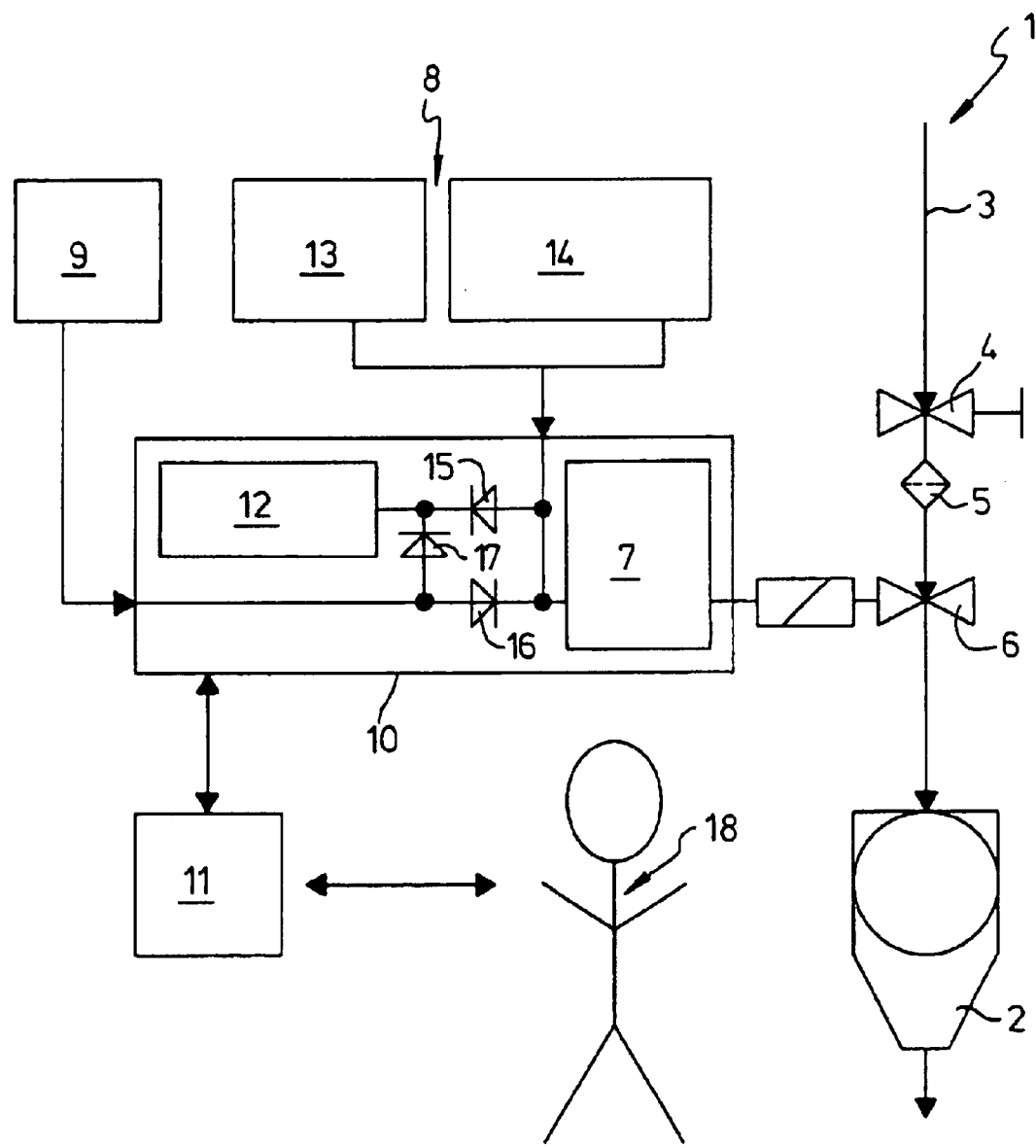
FIG. 1 is a block diagram of a lavatory according to the invention.

FIG. 1 shows a complete lavatory or urinal 1 with a sanitary body 2 or urinal basin 2 as a block diagram. The urinal basin 2 is supplied with flushing water through a water line 3. A stop valve 4 and filter 5 are situated in the water line 3. Here, the stop valve 4 makes it possible to block the water line 3, e.g., for assembling or dismantling the urinal 1. The water filter 5 cleans the water, so that a downstream bistable solenoid valve 6 does not become adversely affected or jammed by any dirt particles.

The bistable solenoid valve is switched by way of a switching stage 7. The switching stage 7 is here optionally supplied by a solar unit 8 or an accumulator 9.

The switching stage 7 is shown as part of the control electronics 10, which are bi-directionally connected with sensors 11.

The electronics 10 are supplied with power by a power supply unit 12, which makes the required voltage and current levels available.

The solar unit 8 encompasses at least one solar cell 13 on the one hand, and an energy storage unit 14 on the other, e.g., a capacitor 14. The solar cell 13 and capacitor 14 are connected in parallel, and hooked up with both the switching stage 7 and power supply unit 12. Either the accumulator 9 or solar unit 8 supplies power to both the switching stage 7 and power supply unit 12. If the capacitor voltage, which corresponds to the solar voltage on the solar cell 13, drops below a specific threshold of the electrical voltage, the accumulator 9 takes over power supply. Once the threshold is exceeded again, power is supplied by the capacitor 14 or solar cell 13.

In a special variant of the invention, the solar cell 13 can be used to supply power to the accumulator 9 and/or the capacitor 14. If necessary, the energy storage unit 14 can be simultaneously designed as an electrical storage unit 9.

Diodes 15, 16 and 17 decouple the supply to the switching stage 7 from the supply to the power supply unit 12, thereby averting mutually unfavorable effects owing, for example, to voltage fluctuations when switching the solenoid valve 6 or the like.

The sensors 11 detect the presence of a user 18, who is situated in front of the sensors 11. Therefore, the sensors must be spatially arranged relative to the sanitary body 2 in such a way that the person 18 is detected when standing in front of the toilet 1. To this end, infrared, ultrasound, radar sensors or the like can be used in particular for directly detecting the user 18. This cannot be gleaned from the depiction on FIG. 1 as a block diagram.

In addition, conductance, temperature, pH, level sensors or the like can also be used for the indirect detection of the user 18. In these embodiments, corresponding changes in siphon trap liquid are detected and evaluated by means of control electronics 10, which encompass an evaluator for this purpose (not shown in any greater detail).

Figure 2:
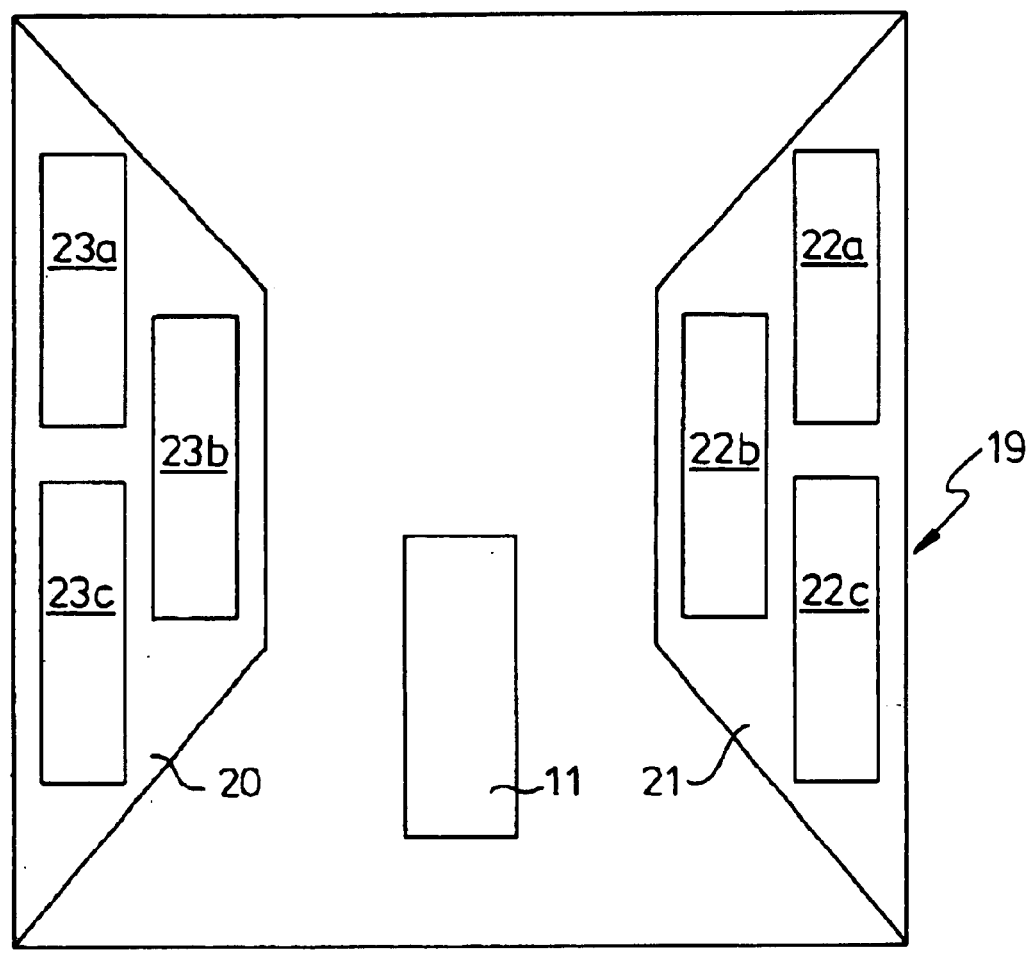
FIG. 2 is a top view of an embodiment of a structural unit with integrated sensors and solar cell.

FIG. 2 shows an example of a structural unit 19 in the form of a cover plate that can be secured, for example, to a wall 24 above or below a toilet bowl 2 (compare also FIGS. 4a, b). The sensors are here preferably centrally arranged, so that they can readily detect users 18 situated immediately in front of the structural unit 19.

Figure 3:
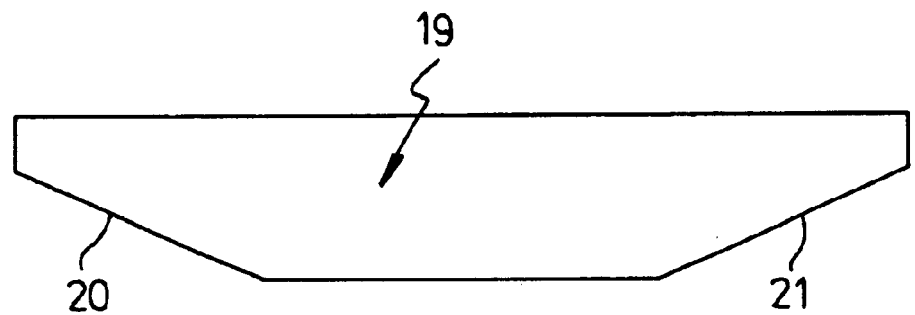
FIG. 3 is a front view of a structural unit according to FIG. 2.

In this embodiment, three solar cells 22a, b, c or 23a, b, c are secured to lateral, beveled surfaces (20, 21) according to FIG. 2 (compare in particular FIG. 3 also). The use of several solar cells 22a, b, c or 23a, b, c enables a higher energy yield, despite the application of smaller, and hence less expensive, solar cells. Another advantage to using numerous solar cells 22, 23 is that the entire solar unit 8 does not fail given a malfunction of a solar cell 22, 23, but only the respective solar cell 22a, b, c or 23a, b, c and its corresponding percentage of the overall power of the solar unit 8 fails. In addition, the various solar cells can be adjusted to different wavelengths.

The arrangement on beveled surfaces 20, 21 allows the solar unit 8 to utilize laterally incident light as well. In a further development of this embodiment, such bevels are also conceivable on the top and bottom sides of the structural unit 19.

Figure 4:
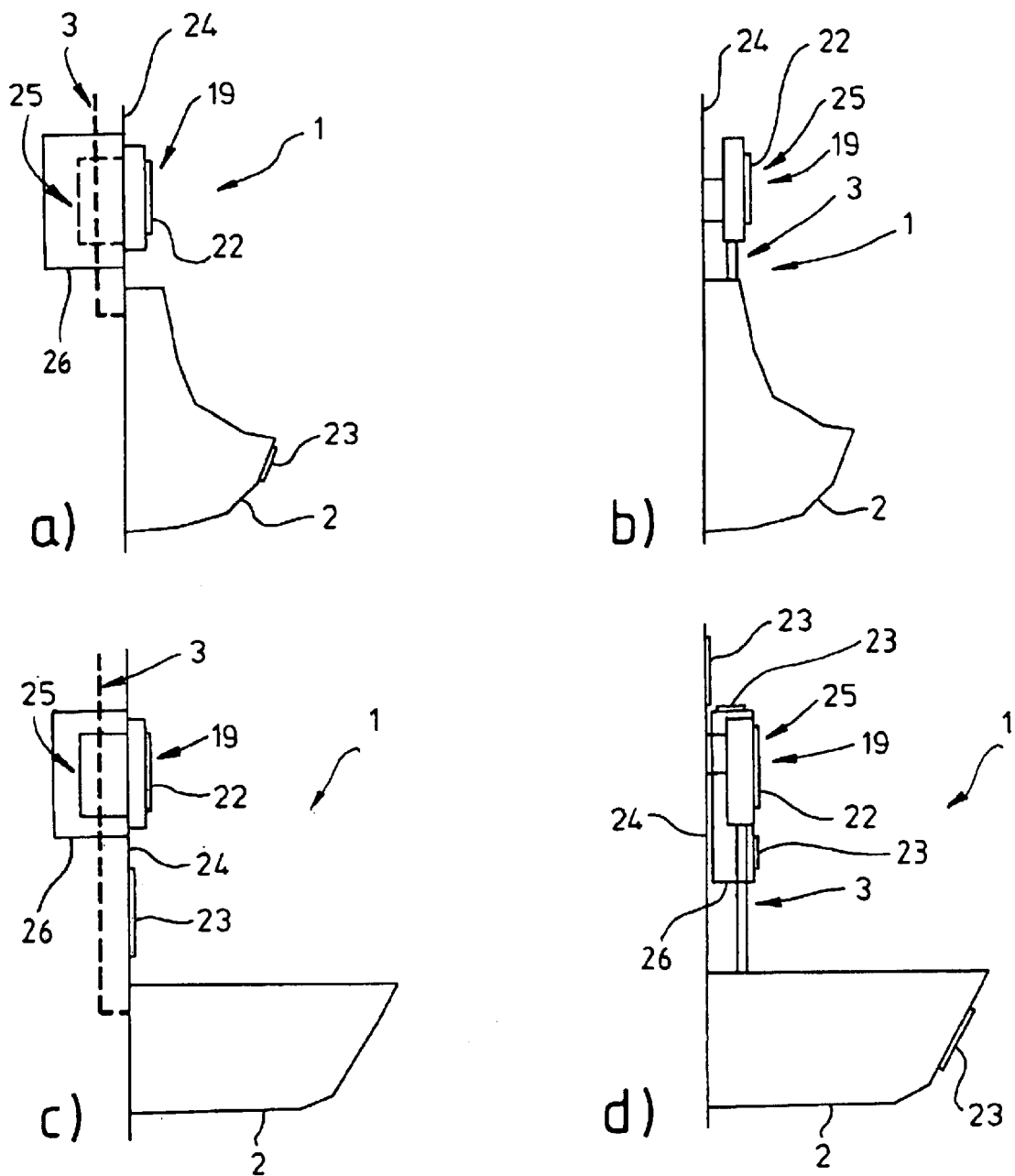
FIG. 4 are four diagrammatically depicted variants of the lavatory according to the invention.

FIG. 4 shows additional lavatory variants according to the invention. FIGS. 4a and 4c relate to a "flush-mounted" urinal 1 or toilet 1. In this case, the water line 3, with or without a water tank 26, or a preferably and alternatively provided flushing box 26, is mounted in the wall 24 or "underground," along with a controller 25. The cover plate 19 here encompasses in particular the solar unit 8 and sensors 11. Among other things, the valve 6, filter 5, etc. are integrated into the controller 25.

As an alternative to the cover plate 19 according to FIG. 3, the latter can be designed without solar cells 22, 23. In this model, for example, the solar cells 22, 23 are secured to the wall 24 and/or sanitary body 2.

FIGS. 4b and 4d show a so-called "surface-mounted" urinal 1 or toilet 1. This means that primarily the water line 3 and the controller 25 or structural unit 19, with or without a water tank 26, or a preferably and alternatively provided flushing box 26, are mounted in front of the wall 24, i.e., "aboveground." In this case, the solar cells 22, 23 can again be secured to the structural unit 19, the water tank 26 or flushing box 26, the wall 24 and/or the sanitary body 2. Only for the sake of clarity, FIG. 4b does not show the water tank 26 or flushing box 26 to be alternatively provided.

Other forms of execution according to the invention are conceivable in addition to the embodiments presented, e.g., integrating the sensors 11 along with the power supply and controller 25 into a toilet 1 or urinal 1 that can be mounted as a complete structural unit, which only have to still be connected to the water hookup in this case.

| Key: | |
|---|---|
| 1 | Lavatory/toilet/closet |
| 2 | Toilet bowl |
| 3 | Water line |
| 4 | Stop valve |
| 5 | Filter |
| 6 | Electromagnetic/solenoid valve |
| 7 | Switching stage |
| 8 | Solar unit |
| 9 | Accumulator |
| 10 | Control electronics |
| 11 | Sensors |
| 12 | Power supply unit |
| 13 | Solar cell |
| 14 | Capacitor |
| 15 | Diode |
| 16 | Diode |
| 17 | Diode |
| 18 | User |
| 19 | Structural unit |
| 20 | Beveled surface |
| 21 | Beveled surface |
| 22 a | Solar cell |
| 22 b | Solar cell |
| 22 c | Solar cell |
| 23 a | Solar cell |

-continued

| Key: | |
|---|---|
| 23 b | Solar cell |
| 23 c | Solar cell |
| 24 | Wall |
| 25 | Controller |
| 26 | Water tank |

What is claimed is:

1. A lavatory (1), such as a toilet or urinal, with a sensor (11) and electromagnetic valve for sensor-controlled flushing, wherein the improvement comprises utilizing a capacitor for energy storage and at least two solar cells (13) for electrical power supply, said at least two solar cells (13) being designed for varying light frequencies.

2. The lavatory (1) of claim 1 further comprising a battery (9) or an accumulator (9) to provide an additional, non-solar electrical power supply.

3. The lavatory (1) of claim 1 or 2 wherein said at least two solar cells (13) are designed for artificial interior lighting.

4. The lavatory (1) of claim 1 or 2 wherein said electromagnetic valve is a bistable electromagnetic valve (6).

5. The lavatory (1) of claim 1 wherein said sensor (11) and said at least two solar cells (13) are integrated into a single structural unit (19, 25).

6. The lavatory (1) of claim 5 wherein said single structural unit (19, 25) with integrated sensor (11) and integrated solar cells (13) is designed as a wall cover (19).

7. The lavatory (1) of claim 1 wherein the electromagnetic valve is a single structural unit (19, 25) disposed in a separate housing (19, 25) spaced apart from the wall (24).

8. The lavatory (1) of claim 1 wherein said sensor (11) and/or said at least two solar cells (13) are integrated into the body of a closet bowl (2).

9. The lavatory (1) of claim 1 wherein, said at least two solar cells (13) are integrated into the wall (24).

10. The lavatory (1) of claim 1 or 2 wherein said at least two solar cells (13) are also brightness sensors.

11. The lavatory (1) of claim 1 further comprising an interface with bus capability.

12. The lavatory (1) of claim 11 wherein said interface with bus capability includes wireless data transmission.

13. The lavatory (1) of claim (1) wherein said sensor (11) for the lavatory-flushing unit simultaneously provides for wireless data transmission.

14. A sensor controlled flushing unit comprising:

(a) a sensor for operating a flushing unit;

(b) an electromagnetic valve operatively connected to said sensor and said flushing unit;

(c) a solar cell for providing electrical power for said sensor and said electromagnetic valve wherein said solar cell is also a brightness sensor.

15. A flushing unit comprising: a sensor; a valve mechanism for providing sensor-controlled flushing of said flushing unit; and at least two solar cells for providing power supply to said flushing unit, wherein one of said at least two solar cells is adapted for varying light frequencies and the other of said at least two solar cells is a brightness sensor.

* * * * *